No. 697,597. Patented Apr. 15, 1902.
H. K. AUSTIN.
TIRE INFLATER.
(Application filed Apr. 25, 1900. Renewed Mar. 14, 1902.)
(No Model.) 2 Sheets—Sheet 1.
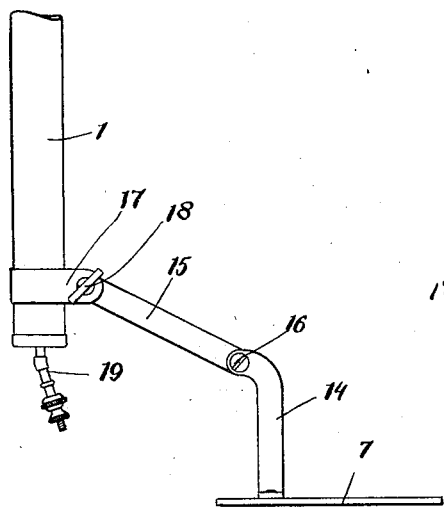
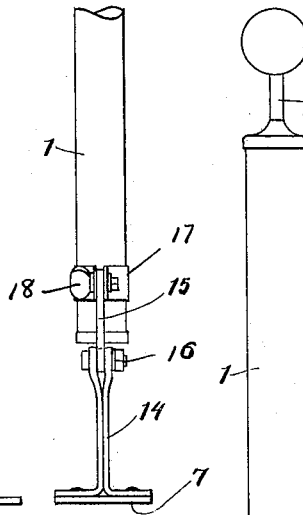
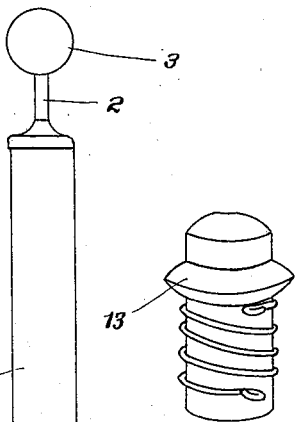
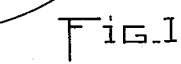
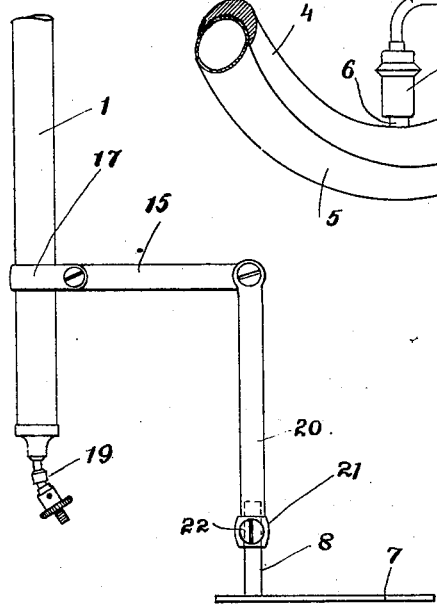
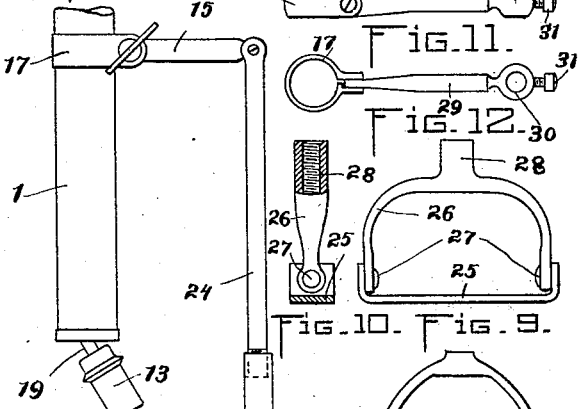
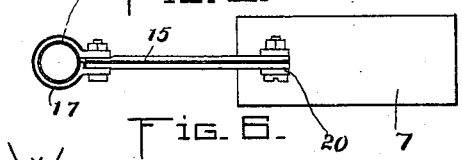
WITNESSES:
INVENTOR

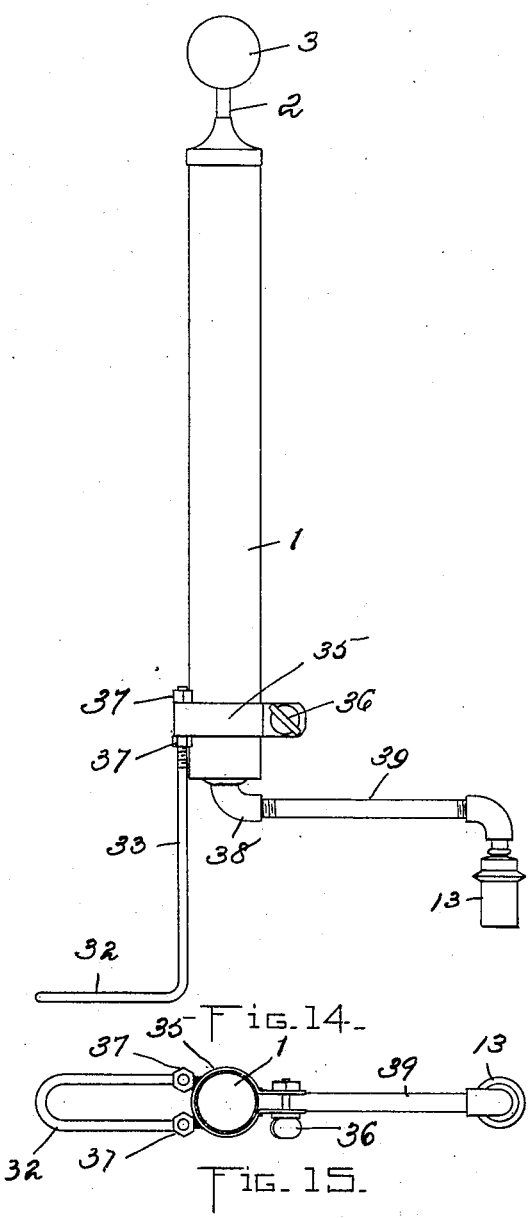

UNITED STATES PATENT OFFICE.

HENRY K. AUSTIN, OF READING, MASSACHUSETTS.

TIRE-INFLATER.

SPECIFICATION forming part of Letters Patent No. 697,597, dated April 15, 1902.

Application filed April 25, 1900. Renewed March 14, 1902. Serial No. 98,265. (No model.)

*To all whom it may concern:*

Be it known that I, HENRY K. AUSTIN, of Reading, in the county of Middlesex and State of Massachusetts, have invented certain new and useful Improvements in Tire-Inflaters, of which the following is a specification.

This invention has for its object to provide an improved inflating device or tire-pump for inflating pneumatic tires of vehicles.
The invention involves the use of a foot-plate, to which is attached a barrel-and-piston inflater, together with certain novel adjustments between the foot-plate and the barrel of the inflater whereby the inflater may be caused to assume different relative positions with respect to the foot-plate and the tire or wheel of the vehicle.

Of the accompanying drawings, Figure 1 represents a side elevation of one form of my invention applied to the rim of a pneumatic-tired vehicle-wheel. Fig. 2 represents a section on the line 2 2 of Fig. 1. Figs. 3 and 4 represent, respectively, side and rear elevations of another embodiment of my invention. Figs. 5 and 6 represent, respectively, a side elevation and plan of still another embodiment. Fig. 7 represents a side elevation of still another form of the invention. Fig. 8 represents a rear elevation of one form of foot-plate for the last said embodiment. Figs. 9 and 10 represent, respectively, a rear elevation and a transverse vertical section of another form of foot-plate for the said embodiment. Figs. 11 and 12 represent, respectively, a side elevation and plan of a modified form of connecting-arm for the last said embodiment. Fig. 13 represents a detail perspective view of a suitable form of connection between the inflater and the tire-valve. Figs. 14 and 15 represent, respectively, a side elevation and horizontal section of an embodiment of my invention resembling in general arrangement that shown in Fig. 1, but having distinctive features.
The same reference characters indicate the same parts throughout the drawings.

The valves of pneumatic vehicle-tires, particularly of the different forms of automobiles, are located at various distances from the tread and may project at different angles, so as to make it desirable when employing a tire-inflater of the foot type having a foot-plate by which it is supported upon the ground to use a compensating connection between the inflater and the tire. Such connection is furthermore made desirable because the tire-valve will be located at different heights from the ground because of the different rotary positions it may have assumed on the wheel, and, furthermore, because of the uneven or sloping nature of the ground upon which the inflater may have to be placed. A flexible tube or hose is sometimes employed to connect the inflater with the tire-valve; but this form of connection is objectionable in many ways, and a direct connection is to be preferred when it can be obtained. My invention more particularly relates to inflaters in which a direct connection is effected between the barrel of the inflater and the tire, as more fully hereinafter referred to, and to this end I employ novel adjustments between the inflater-barrel and the foot-plate, which I shall now proceed to describe.

In all the forms of my invention shown in the drawings, 1 designates the barrel of an ordinary tire pump or inflater, the same containing a piston, which it is not necessary to illustrate, the piston having a rod 2, with a handle 3 at its outer end, whereby the air may be compressed within the barrel and forced into the tire of the vehicle-wheel. A portion of a wheel-rim 4, provided with a pneumatic tire 5, is shown in Fig. 1.

6 represents the inflating-valve with which the tire 5 is equipped.

7 designates a flat foot-plate forming a base upon which the inflater is supported, said plate being adapted to rest upon the ground and to be held down by the operator's foot when a tire is being inflated.

In Fig. 1 a vertical stem 8 is shown as affixed to the foot-plate 7, and to the bottom of the inflater-barrel 1 is affixed a hollow sleeve or stem 9, at the lower end of which is a split collar 10, surrounding the stem 8 on the foot-plate and provided with a clamping thumb-screw 11, adapted to bind the collar upon said stem 8.

12 is a metallic tube forming an outlet from the lower part of inflater-barrel 1 and having at its outer end a suitable connector 13, whereby the inflater may be connected to the valve-nipple 6 of the vehicle-tire by direct pressure against the end of said nipple. Said connector may permissibly be made of india-rubber, with distensible walls, whereby direct connection may be quickly and easily made with the tire-valve. An enlarged detail view of the connector 13 is shown in Fig. 13. This connector or coupling 13 is short and is but slightly flexible, so that the connection with the tire valve or nipple may be effected by setting the device so that the coupling 13 will simply bear on the end of the valve-nipple without necessarily inclosing it, as has usually heretofore been done. The clamping-collar 10 permits of a vertical adjustment of the inflater-barrel on the stem 8, and hence permits the connection from the inflater to the tire-valve to be made at different heights from the ground.

In Figs. 3 and 4 the foot-plate 7 is provided with a vertical stem 14, to the upper end of which a laterally-projecting arm 15 is attached by a pivotal joint at 16. At the outer end of arm 16 is pivotally attached a split collar 17, which surrounds the inflater-barrel 1 and is provided with a clamping thumb-screw 18. The said screw or stud 18, besides acting as a clamp controlling the frictional fit of the collar 17 around the inflater-valve, serves as a pintle for the pivotal connection between said collar and the end of the arm 15. The arrangement is preferably such that the collar may be clamped tightly about the barrel without making the pivotal connection a rigid one, so that the barrel may be fixed at any adjustment within the collar and at the same time may be free to move in an angular manner about the end of the arm 15. At the lower end of barrel 1 is a short outlet-pipe 19, adapted to be connected to the tire-valve. It will be noted that in this form of my invention a great range of adjustability is afforded to the inflater, so that the latter may be readily adjusted to the tire-valve in whatever position the latter may be with respect to the ground. The inflater-barrel may assume practically any vertical or angular adjustment within a vertical plane, and by rotating it within the collar 17 its outlet pipe or nozzle 19, which is preferably directed at an angle to the barrel, may be adjusted to the different angular projections of the tire-valve. The inflater at the same time retains a support upon the foot-plate 17, and as it is also supported to some extent from the tire-valve and by the operator's hand it can be firmly and steadily held during inflation. As to the vertical adjustment of the barrel in the two forms shown, respectively, in Fig. 1 and in Figs. 3 and 4, it is to be noted that in each form one of the members—that is, the foot-plate or the barrel—has a stem formation and the other member has a clamping-collar surrounding said stem, whereby the barrel can be fixed at different vertical adjustments with respect to the foot-plate.

In Figs. 5 and 6 a vertical stem is shown rising from the foot-plate 7 and consisting of a lower fixed section 8 and an upper tubular section 20, adjustable vertically upon the fixed section 8. The upper section has at its lower end a collar 21, surrounding the stem-section 8 and provided with a clamping-screw 22, adapted to fix the upper section of the stem at different heights upon the lower section. An arm 15 is pivotally connected at one end to the upper end of stem-section 20 and at its other end to a clamping-collar 17, adjustably surrounding inflater-barrel 1. This form differs from that shown in Figs. 3 and 4 in having an additional vertical adjustment.

In Fig. 7 a foot-plate 23 of stirrup form is shown, into the bridge of which is screwed a vertical stem 24, having pivoted to its upper end the arm 15, the said arm having the clamping-collar 17 pivoted to its outer end and surrounding the inflater-barrel 1. An additional angular adjustment for the stem 24 may be provided by substituting the foot-plate 25 (shown in Figs. 9 and 10) for the solid stirrup foot-plate 23. (Shown in Figs. 7 and 8.) The foot-plate 25 has a bridge 26 connected to it by a pivot or hinge joint 27, the stem 24 being screwed into a socket 28 on said bridge. An additional vertical adjustment resembling that in Figs. 5 and 6 may be provided for this last-described embodiment of my invention by substituting the arm 29 (shown in Figs. 11 and 12) for the arm 15. (Shown in Fig. 7.) Said arm 29 has at its inner end a collar 30, adapted to surround the stem 24 and having a clamping-screw 31, whereby the arm may be fixed at different vertical adjustments on said stem. To the outer end of arm 29 is pivoted the clamping-collar 17, adapted to surround the barrel 1.

Figs. 14 and 15 represent a footpiece or base 32 and vertical stem 33, made of a single piece of stout wire doubled and bent at right angles, with a clamping-collar 35 surrounding inflater-barrel 1 and attached to the upper end of stem 33 by suitable means, as the set-nuts 37 37, located above and below collar 35 on the threaded ends of the rods which make up stem 33, said collar 35 having a clamping-screw 36. This arrangement is similar to that shown in Fig. 1, but gives a wider range of vertical adjustment to the inflater-barrel. At the lower end of the inflater-barrel 1 is secured a fitting or pipe-bend 38, into which is screwed a horizontal outlet-pipe 39, having the valve-coupling 13 at its downwardly-projecting outer end. The pipe 39 may be readily detached from the inflater-barrel when it is desired to stow the pump in a reduced compass.

In each of the forms illustrated in the drawings there is a base or support, which is adapted to rest on the ground beside the tire and to receive the pressure of the foot of the operator, while the coupling which connects with the tire-valve is laterally offset from said base or support in order to enable the latter to firmly or rigidly support the inflater without exerting pressure upon the wheel-rim or disturbing the coupling of the type hereinbefore described.

I claim—

An inflating device comprising a pump member and a supporting member, the latter having a substantially flat ground-piece to be held between the operator's foot and the ground, the pump member having a coupling laterally remote from said ground-piece and of a substantially rigid nature to connect with the tire-valve and form a support for the pump member, and an adjustable connection between the pump member and the supporting member comprising a stem formation on one of the members and a clamp on the other member slidingly adjustable longitudinally of said stem formation whereby the pump member may be raised and lowered to change the elevation of its coupling with respect to the ground-piece.

In testimony whereof I have affixed my signature in presence of two witnesses.

HENRY K. AUSTIN.

Witnesses:
C. F. BROWN,
A. D. HARRISON.